United States Patent [19]

Martine et al.

[11] Patent Number: 4,976,801
[45] Date of Patent: Dec. 11, 1990

[54] PROCESS FOR MANUFACTURING A STEERING WHEEL FOR A MOTOR VEHICLE

[75] Inventors: Robert Martine, Audincourt; Christian Hënigue, Delle, both of France

[73] Assignee: ECIA - Equipments et Composants pour l'Industrie Automobile, Audincourt, France

[21] Appl. No.: 463,799
[22] Filed: Jan. 8, 1990

Related U.S. Application Data

[63] Continuation of Ser. No. 311,554, Feb. 16, 1989, abandoned.

[30] Foreign Application Priority Data

Feb. 19, 1988 [FR] France ................. 88 02040

[51] Int. Cl.⁵ ................................. B28B 1/30
[52] U.S. Cl. ..................... 156/245; 29/894.1; 74/552; 74/558
[58] Field of Search ............... 156/242, 245; 74/552, 74/558; 29/159 B

[56] References Cited

U.S. PATENT DOCUMENTS 2,409,645 10/1946 Sawyer ........................... 784/552
4,448,091 5/1984 Bauer et al. .................. 29/159 B X

FOREIGN PATENT DOCUMENTS

| 27293 | 4/1981 | European Pat. Off. . | |
| 139015 | 5/1985 | European Pat. Off. . | |
| 173826 | 3/1986 | European Pat. Off. . | |
| 255171 | 2/1988 | European Pat. Off. | 74/552 |
| 3425959 | 1/1986 | Fed. Rep. of Germany | 74/552 |
| 2153670 | 5/1973 | France . | |
| 2518479 | 6/1983 | France . | |
| 55-47959 | 4/1980 | Japan | 74/552 |
| 13719 | 5/1914 | United Kingdom | 74/552 |
| 1571902 | 7/1980 | United Kingdom | 74/552 |

Primary Examiner—Caleb Weston
Attorney, Agent, or Firm—Sughrue, Mion, Zinn, Macpeak & Seas

[57] ABSTRACT

The steering wheel comprises a central hub (10), a peripheral rim (20), and at least one substantially radial branch (30) interconnecting the hub (10) and the rim (20). The hub (10) and the rim (20) are metallic, the rim (20) is circular or substantially circular and the branch (30) comprises a sleeve (31) which surrounds the hub (10) and a sheath (32) which at least locally covers the rim (20) and is made from at least one synthetic material in the state of a semi-manufactured product moulded onto the hub (10) and rim (20).

9 Claims, 2 Drawing Sheets

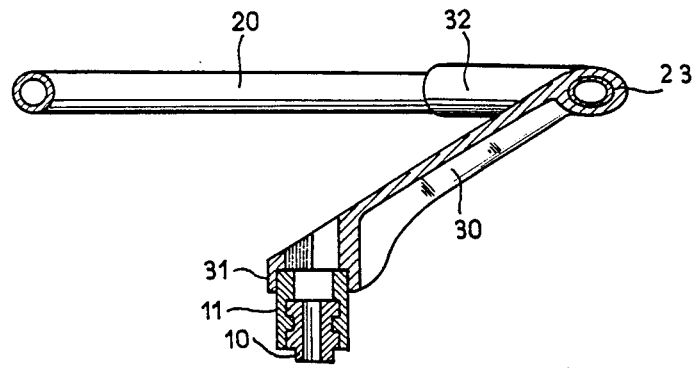
FIG.1B
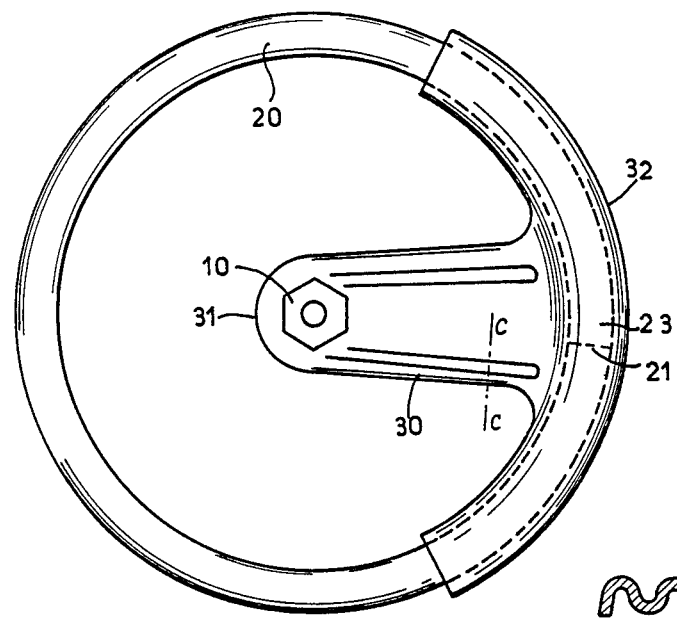
FIG.1A
FIG.1C

4,976,801

PROCESS FOR MANUFACTURING A STEERING WHEEL FOR A MOTOR VEHICLE

This is a continuation of application No. 07/311,554, filed Feb. 16, 1989, abandoned.

The present invention relates to steering wheels for in particular a motor vehicle and especially those steering wheels which have metallic parts and parts composed of moulded synthetic materials.

Steering wheels of in particular a motor vehicle must satisfy contradictory requirements.

For example, they must be relatively light so as to have a small mass and a small moment of inertia relative to the axis of the steering column for in particular reasons of comfort. As a result of the small mass, when the vehicle travels at high speed or on roads in a bad condition, the steering wheel does not vibrate. The small moment of inertia facilitates the steering for manoeuvring and changing direction when the vehicle is in use.

Furthermore, for reasons of safety, the steering wheel must be capable of supporting large deformations resulting from force created in the event of a violent shock, for example impact from the front. In particular, if the thorax of the driver encounters the steering wheel, this must not cause bruising or wounds resulting from cuts or perforations.

It can therefore be seen that it is not easy to manufacture a steering wheel for a motor vehicle which satisfies all these requirements and is also relatively cheap.

In addition to these technical requirements, there are aesthetic requirements, since the steering wheel must have an attractive appearance and a pleasant feel and follow the current fashion trends.

According to the prior art, various solutions have been proposed for constructing steering wheels which satisfy most of these requirements.

A steering wheel mainly comprises a central hub and a peripheral rim which are interconnected by at least one substantially radial arm or branch.

Such steering wheels comprise, in addition to the hub which is generally composed of metal, other metallic components. The present tendency is to employ this metal hub and to associate therewith a rim and branches having metallic reinforcements or stiffeners, usually covered with a synthetic material so as to satisfy at once mechanical, safety and aesthetic requirements.

As explained in the French patent application No. 2,518,479, a metallic hub is employed with which are associated branches and a rim obtained by a double injection moulding method in the course of which there is first of all produced the outer part composed of plastics material into which another plastics material including a filler is injected which acts as a hub.

According to another method disclosed in the European patent application No. 0 139 015, a steering wheel having a metallic hub and branches is manufactured with which a rim made from a plastics material having a continuous fibre filler is associated.

According to another method disclosed in the European patent application No. 0 173 826, there are employed for the branches and the rim continuous long fibres embedded in a resin which are coiled and with which there are associated split metallic sleeves which permit a suitable winding of the fibres while avoiding the parting of the various layers in the regions in which they diverge.

According to another method disclosed in the French patent application No. 87 13 323 (corresponding to U.S. patent application No. 07/248,073), there is manufactured a steering wheel which, apart from its central metallic hub, is made from at least one synthetic material filled with long fibres and used in the state of a semi-manufactured product in the form of flat pieces loaded on edge in the mould and shaped by stamping.

As can be seen, none of these methods uses for producing a steering wheel for in particular motor vehicle, a special method in which there are employed only two metallic components constituted by the rim and the hub proper.

SUMMARY OF THE INVENTION

An object of the invention is to manufacture an improved steering wheel, in particular for a motor vehicle, which has only two metallic parts so as to satisfy all of the usual requirements.

In the present description, the expression steering wheel designates the inner part of the latter which has a mechanical function, to the exclusion of any subsequent outer coatings which impart thereto its final aspect which is pleasant to look at and touch.

The invention provides a steering wheel, in particular for a motor vehicle, comprising, among other elements, a central hub, a peripherial rim and at least one substantially radial branch interconnecting the hub and rim, wherein the rim and the hub are metallic, the rim is circular or substantially circular and the branch is made from at least one synthetic material in the state of a semi-manufactured product moulded onto the rim and the hub and comprising a sleeve which surrounds the hub and a sheath which at least locally covers the rim.

Further features of the invention will be apparent from the following description and claims with reference to the accompanying drawing which is given solely as an example, in which:

BRIEF DESCRIPTION OF THE DRAWING

FIG. 1A is a top plan view or an embodiment of a steering wheel according to the invention;

FIG. 1B is a meridian sectional view of the steering wheel of FIG. 1A;

FIG. 1C is a partial sectional view of the steering wheel of FIG. 1A in the plane C of the latter;

DETAILED DESCRIPTION OF PREFERRED EMBODIMENTS

Figure 2B:
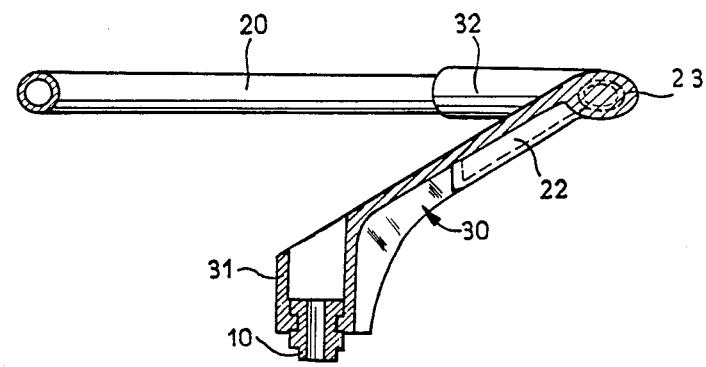
FIG. 2B is a meridian sectional view of the steering wheel of FIG. 2A.

As steering wheels, in particular for motor vehicles, are well known in the art, the following description will concern only that which directly concerns the invention. For the rest, a person skilled in the considered art will draw from the conventional solutions available to him for dealing with particular problems he encounters.

In the following description, the same reference numeral will always be used for designating a similar element, whatever the embodiment.

As can be seen in the Figures of the drawing, the steering wheel according to the invention comprises a hub 10 and a rim 20 interconnected by at least one substantially radial branch or arm 30.

Conventionally, the hub 10 is metallic and has a configuration which enables it to be mounted on the terminal member of the end of the steering column located in the compartment of the vehicle. This hub is provided with all the usual fastening means, for example comprising a screw, a nut, and wedging cones. If desired, the hub is equipped with an energy absorber which improves safety conditions. This hub may also be equipped with a device for finely adjusting its angularly fixed position so as to perfect the orientation of the steering wheel for aesthetic reasons.

Figure 2A:
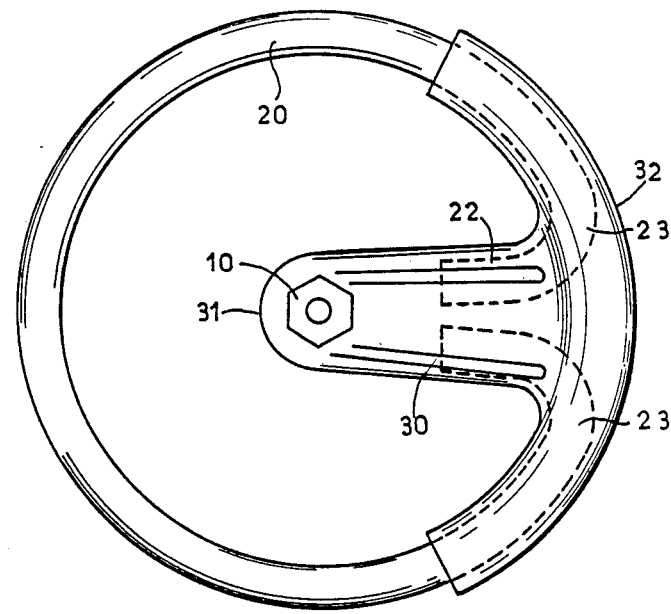
FIG. 2A is a top plan of another embodiment of a steering wheel according to the invention.

The rim 20 has an approximately circular configuration. It is for example made from a steel or aluminium tube. The confronting ends 21 of the rim are left as they are or, if desired, joined by welding as illustrated in the embodiment of FIG. 1A. In the case where the rim is discontinuous, it can be arranged that it be extended by bent, substantially centripetally-extending legs 22 as shown in the embodiment of FIG. 2A. This hub 10 and rim 20 are interconnected by at least one substantially radial branch 30 made from at least one synthetic material. As can be seen, this branch 30 comprises a sleeve 31 which surrounds the hub 10 and a sheath 32 which at least locally covers the rim 20.

As can be seen in the meridian sectional views of the embodiments of FIGS. 1 and 2A, the rim 20 is deformed in the region 23 which is at least locally covered with the sheath 32 of the branch 30. This region 23 is given a cross-sectional shape different from that of the rest of the rim. Preferably, the section 23 in this region has a non-circular shape, for example an elliptical shape, as illustrated, so as to obtain a good anchoring of the rim and branch.

The branch 30 is obtained directly by moulding onto the hub 10 and the rim 20. To this end, synthetic materials are preferably employed which are in the form of semi-manufactured profits, for example thermoplastic products (e.g. pressable reinforced thermoplastic), thermosetting products (e.g. sheet moulding compound). This moulding is achieved in a single operation.

This operation employs compression rather than injection. This permits employing isotropic materials, if required reinforced with various fibres which are long or otherwise, continuous or otherwise, or other fillers, for example, mineral or organic fillers. When a TRE is used, there are employed a pressure of about 200 bars, a temperature of the material of about 220° C. and a temperature of the mould of about 50° to 60° C. When an SMC is used, there are employed a pressure of about 100 bars, a temperature of the material on the order of that of the ambient temperature and a temperature of the mould on the order of about 140° to 145° C.

If need be, suitable fillers are incorporated in the synthetic material.

The embodiment of FIG. 1B comprises an energy absorber 11.

In order to ensure a firm connection of this branch with the rim and the hub, they may be provided with splines, grooves, recesses, ribs, knurling or the state of the surface may also be modified so that the cohesion between the different materials employed is as perfect as possible.

Thus, the steering wheel according to the invention presents assemblies in the region of the junctions of different materials which satisfy all of the standard specifications as concerns safety which include shocks and alternating fatigue or bending tests.

The whole interest of a steering wheel according to the invention and all of the advantages it affords are therefore clear, since it has only two metallic component parts, namely the hub and the rim, which are interconnected by at least one branch produced by a direct moulding of at least one synthetic material, if need be reinforced by fillers, such as mineral or metallic fibres.

What is claimed is:

1. A process of manufacturing a steering wheel for a motor vehicle, said steering wheel comprising a central metallic hub, a peripheral metallic rim and at least one substantially radial branch interconnecting the hub and the rim, said branch comprising a sleeve, which surrounds the hub, and a sheath which at least locally covers the rim, said hub and said rim being the sole metallic parts of the steering wheel, said process comprising: providing a synthetic material in the state of a semi-manufactured product, said synthetic material being free of any metallic reinforcing elements; and, in a single step, compression-molding only said synthetic material onto the hub and rim to directly produce a branch with an integral sleeve and sheath which are firmly fixed directly to the hub and rim, respectively.

2. A process according to claim 1, further comprising deforming the rim in at least a region covered by the sheath to produce a rim having a non-circular cross-sectional shape.

3. A process according to claim 1, further comprising the step of making the rim tubular.

4. A process according to claim 1, further comprising the step of making the rim continuous.

5. A process according to claim 4, further comprising forming a continuous rim from a non-continuous element having confronting ends, and joining said confronting ends by welding.

6. A process according to claim 1, further comprising the step of making the rim discontinuous.

7. A process according to claim 6, further comprising the step of making the discontinuous rim from a non-continuous element which is extended by partial legs bent in a substantially centripetal direction.

8. A process according to claim 1, further comprising the step of making the branch from a thermoplastic material.

9. A process according to claim 1, further comprising the step of making the branch from a thermosetting material.

* * * * *